United States Patent [19]

Nishitani

[11] Patent Number: 5,184,169
[45] Date of Patent: Feb. 2, 1993

[54] PHOTOGRAPHY MODE INPUT SYSTEMS
[75] Inventor: Yasuhiro Nishitani, Tokyo, Japan
[73] Assignee: Fuji Photo Film Co., Ltd., Kanagawa, Japan
[21] Appl. No.: 687,615
[22] Filed: Apr. 19, 1991
[30] Foreign Application Priority Data
   Apr. 19, 1990 [JP] Japan .................................. 2-103447
[51] Int. Cl.⁵ ............................................... G03B 7/00
[52] U.S. Cl. ..................................... 354/412; 354/443; 354/486
[58] Field of Search ................ 354/412, 442, 443, 486
[56] References Cited
   U.S. PATENT DOCUMENTS
   4,286,849  9/1981  Uchidoi et al. ...................... 354/412
   5,040,016  8/1991  Ishikawa et al. ..................... 354/412

*Primary Examiner*—Russell E. Adams
*Attorney, Agent, or Firm*—Young & Thompson

[57] ABSTRACT

A photography mode input system for inputting any selected one of a plurality of predetermined optional photography modes into a camera having a microcomputer for controlling exposure. The system comprises a series of cards each having a different signal element pattern such as a notch pattern each respectively corresponding to an optional photography mode, and a switch array for detecting the signal element pattern. The switch array is disposed in a slot formed in a holder on the camera, and is connected to the microcomputer. The card is made of opaque plastic material or paper. The switch array comprises a series of switches each outputting a binary signal depending on whether each switch detects a notch, and the binary signals from the switches are read out as a binary code, on the basis of which the corresponding optional photography mode is set in the camera.

17 Claims, 5 Drawing Sheets

F I G. 5
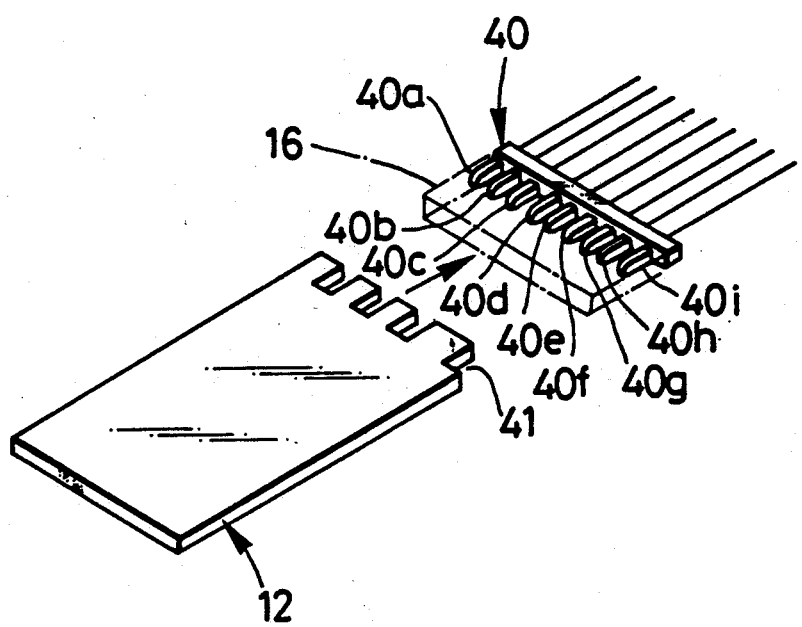

PHOTOGRAPHY MODE INPUT SYSTEMS

BACKGROUND OF THE INVENTION

The present invention relates to a photography mode input system for a camera, and more particularly to a photography mode input system using insertable cards having notches whose pattern sets the respective photography modes.

It is well known in the art to provide a camera with a programmed automatic exposure (AE) system wherein the combination of shutter speed and aperture size is predetermined according to subject brightness. With such a programmed AE system, the user cannot manually set an optional exposure condition of the camera. But it is sometimes desirable to set the camera in a different exposure condition from the predetermined standard exposure condition, according to the scene to be photographed For this reasons, cameras having a photographic mode input system have also been provided, wherein the user can input a desired photography mode into the camera instead of the programmed standard exposure condition.

As conventional photography mode input systems, there have been used a dial or button input device as well as an IC (integrated circuit) card input system and a bar code input system. In the IC card input system, a variety of IC cards each having a built-in ROM and a built-in CPU are used, from which a desired IC card is selected and inserted into the camera thereby to change the photography mode. In the bar code input system, the user can inspect a booklet of various photography samples accompanied with respective bar codes, so as to select one of these samples as corresponding to a desired photography mode, and input the bar code of the selected sample into the camera by means of a bar code reader.

However, such IC cards having a built-in ROM and CPU are expensive so that it is economically burdensome for the user to buy a plurality of different IC cards. On the other hand, the above-described bar code input system is not only expensive but also inconvenient for carrying about, because it is necessary to use the booklet of photographic samples as well as the bar code reader.

SUMMARY OF THE INVENTION

In view of the foregoing, it is an object of the present invention to provide a photography mode input system for a camera, which is inexpensive and suitable for carrying about, and is easy to use.

To achieve the above and other objects, the present invention provides a photographic mode input system for inputting at least an optional photography mode into a camera having a microcomputer for controlling exposure, with at least one card member having a signal element pattern corresponding to an optional photography mode, and detecting means for detecting the signal element pattern, the detecting means being disposed inside the camera and connected to the microcomputer.

The detecting means detect the presence or absence of signal elements constituting the signal element pattern, in respective predetermined positions of the card member. The detecting means is for example a switch array comprising a series of switches each outputting a binary signal depending on whether each switch detects a said signal element, and the binary signals from the respective switches are read out as a binary code. This construction serves to reduce the cost of detecting data as to the desired photography mode, compared with the cost of conventional IC card or bar code input systems.

The signal elements may be provided by cut-outs, notches or projections, holes, transparent windows, reflecting surface areas, metal particles, or the like, wherein the cut-outs, holes or projections can be detected by mechanical switches, whereas the reflecting surface areas or transparent windows can be detected by photo-sensors, and the metal particles can be detected by magnetic sensors.

The card can be made of opaque plastic material or paper, and the signal element pattern can be easily formed by molding integrally with the card, or by punching in the card, so that it becomes possible to make the card inexpensive and convenient to use.

According to the present invention, merely by inserting a card member corresponding a desired photography mode in a slot formed in the camera, the pattern of the signal element is detected by the detecting means, and the output signal from the detecting means is read in the microcomputer of the camera, so that the desired photography mode is automatically set in the camera.

BRIEF DESCRIPTION OF THE DRAWINGS

Other objects and advantages of the invention will become apparent from the following description taken in conjunction with preferred embodiments with reference to the accompanying drawings, in which:

FIG. 5 shows a further embodiment of the present invention.

DETAILED DESCRIPTION OF THE EMBODIMENTS

Figure 1:
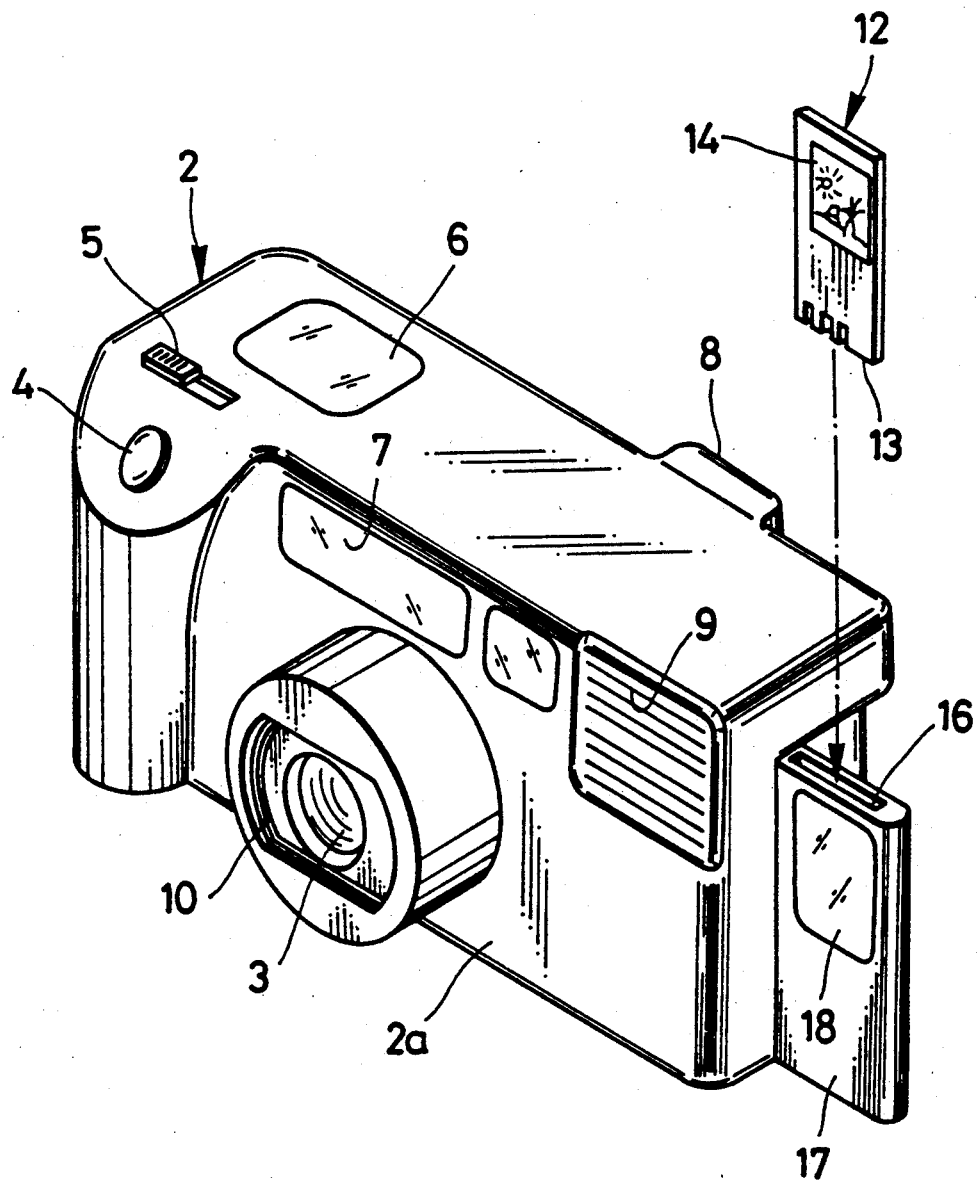
FIG. 1 is a perspective view of the front of a camera embodying the present invention.

FIG. 1 shows the outer appearance of a camera 2 having a photography mode input system according to an embodiment of the invention, wherein there are provided a taking lens 3, a shutter button 4, a main switch 5, a liquid crystal display (LCD) 6, an AF window 7, a viewfinder 8, and a flash 9 on a camera body 2a. Within the AF window, a light emitter and a light receiver of an autofocus system are disposed.

When the main switch 5 is turned on, a lens barrier 10 for protecting the taking lens is opened to make the camera ready for photographing. Thereafter when the shutter button 4 is depressed halfway, the camera 2 is automatically focused on a subject viewed through the viewfinder 8 and, at the same time, the exposure is decided according to a programmed automatic exposure control (AE) system. When the shutter button 4 is then fully depressed, a photograph is taken.

Furthermore, the camera 2 can operate also in a special photography mode independently of the AE system, wherein the user can select a desired one of a plurality of predetermined special modes by inserting a card 12 corresponding to the desired mode, into the camera 2, in a manner as described below.

The card 12 is formed along one edge with signal elements having a pattern corresponding to one of a plurality of predetermined special photography modes. The signal element is, for example, provided with a notch or notches 13 formed in the bottom edge of the card, wherein the cards corresponding to different modes have different notch patterns including a pattern having no notch. The notch 13 may be of U-shape, V-shape, as well as rectangular. Each card 12 has information such as a picture 14 on its front surface that indicates the corresponding photography mode, so that the user can easily determine the mode to which the card 12 corresponds.

The card 12 is inserted in a slot 16 formed in a holder 17 which is pivotally mounted on the side wall portion of the camera body 2a. The holder 17 has a transparent wall portion or a window 18 through which the picture 14 of the inserted card 12 can be seen.

Figure 2:
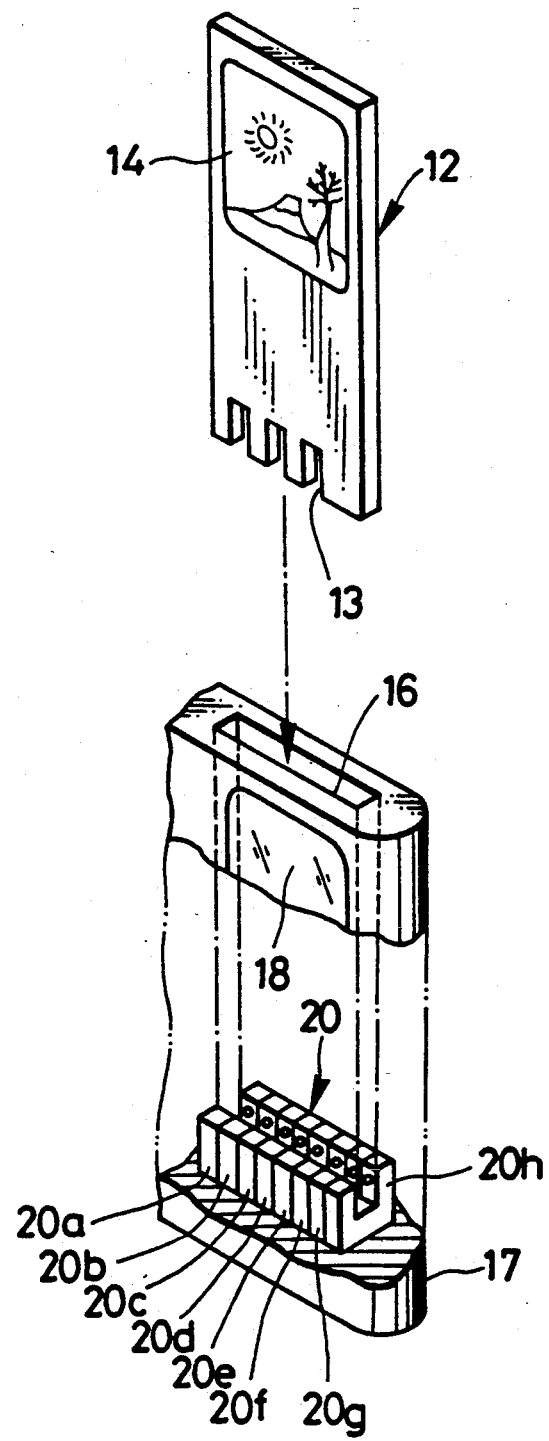
FIG. 2 shows a photography mode input system according to an embodiment of the present invention.

The interior of the holder 17 is shown in FIG. 2, wherein a switch array 20 for detecting the notches 13 is disposed in the bottom of the slot 16. The switch array 20 comprises a plurality of, for example, eight photo-interrupters 20a to 20h arranged side by side.

Each photo-interrupter 20a to 20h includes a light emitter and a light receiver, and outputs a binary signal "1" or "0" depending on whether the receiver receives light from the associated emitter when the card 12 is inserted in the slot 16. The combination of the binary signals "1" or "0" from the respective photo-interrupters 20a to 20h constitutes a binary code which is sent as a mode signal to a CPU 21 (FIG. 3) built into the camera.

In the card 12 shown in FIG. 2 for example, the notches 13 will be positioned between the light-emitters and light receivers of the photo-interrupters 20b, 20d and 20f, so that a mode signal "01010100" is generated.

Figure 3:
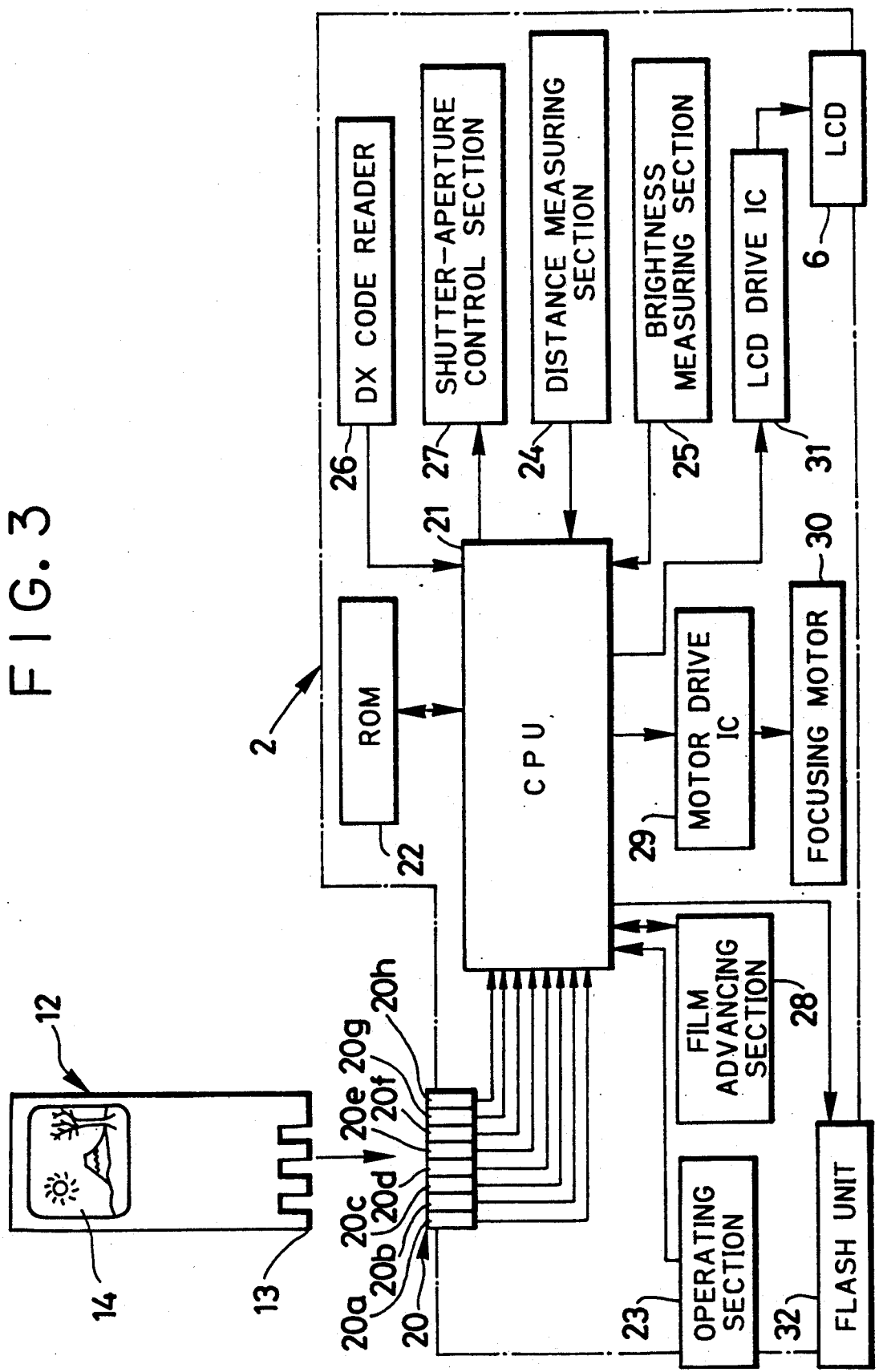
FIG. 3 is a block diagram showing an example of circuitry of the camera.

Referring to FIG. 3 showing the circuitry of the camera 2, the CPU 21 operates in accordance with a program stored in a ROM 22 which stores not only an AF/AE program for standard photography but also various programs corresponding to the predetermined special photography modes.

The CPU 21 is supplied with operational signals from an operating section 23 including the shutter button 4 and the main switch 5, with subject distance data and subject brightness data from a distance measuring section 24 and a brightness measuring section 25, respectively, and with film sensitivity data (ASA speed) from a DX code reader 26. Based on these signals and data, the CPU 21 controls a shutter-aperture control section 27, an automatic film advancing section 28, a motor drive IC (integrated circuit) 29 for driving a focusing motor 30, an LCD drive IC 31 for driving the LCD 6, and a flash unit 32 including the flash 9. The focusing motor 30 is driven by the motor drive IC 29 to focus the taking lens 3 on a principal subject.

When a selected one of the above-described cards 12 is inserted in the slot 16 of the holder 17 after the main switch 5 is turned on, the CPU 21 reads out, upon half depression of the shutter button 4, simultaneous signals as a mode signal from all the photo-interrupters 20a to 20h of the switch array 20. Based on this mode signal, the CPU 21 selects the corresponding one of the predetermined special programs stored in the ROM 22. An example of bit patterns of mode signals for several special photography modes is shown in the following table:

TABLE

| Mode Signal | Photography Mode |
| --- | --- |
| 10101011 | landscape mode |
| 10101100 | portrait mode |
| 10101101 | wedding mode |
| 10101110 | sports mode |
| 10101111 | auto-bracketing mode |
| ... | ... |
| ... | ... |

As indicated above, there are a landscape mode, a portrait mode, a wedding mode, a sports mode, an automatic bracketing mode and so forth as special photography modes, and special programs corresponding to these modes are stored in the ROM 22. In the landscape mode, an optimum aperture size is determined depending on film sensitivity data and subject distance data, whereas the exposure is controlled according to that aperture size, so that infinite range is included within the depth of field. In the sports mode, the exposure is so controlled that the shutter speed can be set higher, depending on the film sensitivity data and subject distance data. In the auto-bracketing mode, the camera 2 will automatically make a series of exposures in rapid succession when the user presses the shutter button 6, this series including a picture taken at the standard exposure setting determined by the AE system, other pictures with less exposure than the standard exposure differing from each other by a predetermined decrement of exposure, and still other pictures with more exposure differing from each other by a predetermined increment of exposure.

For example, when a mode signal "10101011" is supplied from the switch array 20 to the CPU 21, the CPU 21 determines with reference to the above table that the landscape mode is desired, and calculates exposure data such as an aperture size and a shutter speed in accordance with the program for landscape mode, whereupon the shutter-aperture control section 27 operates according to the exposure data.

Although there are many kinds of cards 12 corresponding to various photography modes, because each card 12 has a picture 14 thereon from which the mode is obvious to which the card corresponds, the user is not likely to mistake the mode of the card.

Figure 4:
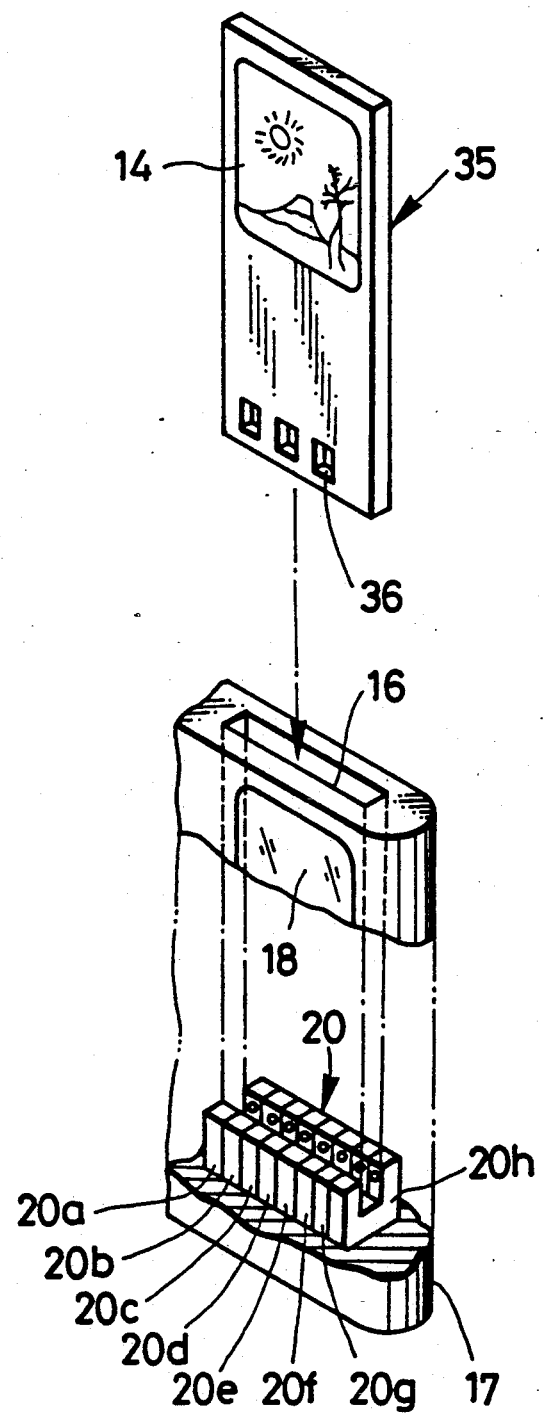
FIG. 4 shows another embodiment of the present invention.

Because the switch array 20 according to the above embodiment is comprised by photo-interrupters, the cards 12 can be made of black or dark colored paper or plastic material. Furthermore, it is possible to replace the notches 13 by holes as is shown in FIG. 4, wherein a card 35 is formed with holes 36 in the bottom edge thereof. The holes 36 may be round as well as rectangular. The notches or the holes may be punched in the cards, or formed integrally with the card by molding. Consequently, the cards can be formed at a very low cost, and will be light in weight, and thus suitable for carrying about. The above embodiments are also preferable to avoid chattering.

FIG. 5 shows another embodiment of the invention, wherein a switch array 40 comprises a plurality of, for example nine pushbutton switches 40a to 40i arranged side by side in the bottom of a slot 16. The pushbutton switches 40a to 40i are connected to the CPU 21 in the same way as in the first embodiment. A card 12 is also formed in its one end with notches 41. However, since the switch 40a is provided for generating a timing signal to the CPU 21, that is, the CPU 21 starts reading the output signals from the other switches 40b to 40i upon the switch 40a being turned on, all the cards 12 must have no notch in the area associated with the switch 40a. In the example shown in FIG. 5, when the card 12 is inserted into the slot 16, the switches 40a, 40c, 40e, 40g and 40h are depressed, while the switches 40b, 40d, 40f and 40i are not depressed. When each switch of the switch array 40 is preset to output a "0" signal upon being depressed, a mode signal "101010110" is read in the CPU 21 at that time. It is, of course, possible to preset each switch to output a "1" signal upon being depressed.

According to this last embodiment, because the desired photography mode is read in the camera immediately when the card 12 is inserted into the slot 16, it becomes possible thereafter to remove the card 12 from the slot 16 prior to photographing. Therefore, the depth of the slot 16 may be such as to receive only the notched end portion of the card 12, and the slot 16 having such a shallow depth can be formed directly in the camera body instead of being formed in a holder as in the first embodiment.

Furthermore, it is possible to set a combination of more than one special photography mode by the successive insertion and removal of different cards, such as an auto-bracketing mode card, followed by the insertion and removal of another kind card, a portrait mode card for instance, prior to photographing.

Although the invention has been described in detail above with reference to preferred embodiments, various modifications within the scope and spirit of the invention will be apparent to persons skilled in this technological field. Thus, the invention should be considered as being limited only by the appended claims.

What is claimed is:

1. A photography mode input system for inputting an optional photography mode into a camera having a microcomputer for controlling exposure, comprising:
a card member having a signal element pattern corresponding to a predetermined optional photography mode, said card member being provided with graphic information indicating a corresponding photography mode; and
detecting means for detecting said signal element pattern, said detecting means being disposed on said camera and connected t said microcomputer, wherein said detecting means detect the presence or absence of signal elements constituting said signal element pattern, said signal elements occupying different respective predetermined positions on said card member.

2. A photography mode input system as defined in claim 1, wherein said card member is made of opaque plastic material.

3. A photography mode input system as defined in claim 1, wherein said card member is made of opaque paper.

4. A photography mode input system as defined in claim 1, wherein said graphic information on said card member is a photograph taken under an exposure condition corresponding to the photography mode of said card.

5. A photography mode input system as defined in claim 1, wherein said signal element pattern is disposed in one edge of said card member.

6. A photography mode input system as defined in claim 5, wherein said detecting means comprises a switch array disposed in a slot provided in said camera, said slot receiving at least said one edge of said card member.

7. A photography mode input system as defined in claim 6, wherein said slot is formed in a holder mounted on a body of said camera.

8. A photography mode input system as defined in claim 7, wherein said holder is pivotally mounted on said camera body.

9. A photography mode input system as defined in claim 7, wherein said holder is formed with an observation window through which a said card member inserted in said slot is visible.

10. A photography mode input system as defined in claim 6, wherein said switch array comprises a series of switches each outputting a binary signal depending on whether each said switch detects a said signal element, and said binary signals from said switches are read out as a binary code.

11. A photography mode input system as defined in claim 10, wherein said binary code is read out upon half depression of a shutter button of said camera.

12. A photography mode input system as defined in claim 10, wherein said binary code is read out upon a predetermined one of said switches detecting insertion of a said card member.

13. A photography mode input system as defined in claim 10, wherein each said signal element is a cut-out formed in said one edge of said card member.

14. A photography mode input system as defined in claim 13, wherein each said switch is a photo-interrupter including a light emitter and a light receiver between which said one edge of said card member is positioned, and a said cut-out is detected when a said light receiver receives light from a said light emitter.

15. A photography mode input system as defined in claim 14, wherein each said cut-out is formed as a window.

16. A photography mode input system as defined in claim 13, wherein each said cut-out is formed as a notch.

17. A photography mode input system as defined in claim 16, wherein each said switch is a pushbutton switch which is depressed by an area having no notch in said one edge when said card is inserted in said slot, and a said notch is detected when a said pushbutton switch is not depressed.

* * * * *